United States Patent
Murray

(10) Patent No.: US 10,481,039 B2
(45) Date of Patent: Nov. 19, 2019

(54) PIPE TESTING APPARATUS AND METHOD

(71) Applicant: DOOSAN BABCOCK LIMITED, Crawley, Sussex (GB)

(72) Inventor: Graham Murray, Renfrew (GB)

(73) Assignee: DOOSAN BABCOCK LIMITED, Crawley, Sussex (GB)

(*) Notice: Subject to any disclaimer, the term of this patent is extended or adjusted under 35 U.S.C. 154(b) by 0 days.

(21) Appl. No.: 15/571,657

(22) PCT Filed: May 3, 2016

(86) PCT No.: PCT/GB2016/051266
§ 371 (c)(1),
(2) Date: Nov. 3, 2017

(87) PCT Pub. No.: WO2016/178012
PCT Pub. Date: Nov. 10, 2016

(65) Prior Publication Data
US 2018/0143099 A1    May 24, 2018

(30) Foreign Application Priority Data
May 4, 2015    (GB) .................................. 1507619.3

(51) Int. Cl.
*G01M 5/00* (2006.01)
*F16L 1/20* (2006.01)

(52) U.S. Cl.
CPC ........ *G01M 5/0025* (2013.01); *G01M 5/0058* (2013.01); *F16L 1/203* (2013.01)

(58) Field of Classification Search
CPC ... G01M 5/00255; G01M 5/0058; F16L 1/203
See application file for complete search history.

(56) References Cited

U.S. PATENT DOCUMENTS

| | | | |
|---|---|---|---|
| 2011/0178736 A1* | 7/2011 | Westra | F17D 5/02 702/50 |
| 2012/0257931 A1* | 10/2012 | Tkaczyk | F16L 1/203 405/168.3 |
| 2018/0156688 A1* | 6/2018 | Murray | G01M 5/0058 |

FOREIGN PATENT DOCUMENTS

| | | |
|---|---|---|
| CN | 203858162 U | 10/2014 |
| EP | 0 507 572 A1 | 10/1992 |

(Continued)

OTHER PUBLICATIONS

Dr. Scott McCann, et al., "Effects of Reeling on the Mechanical Properties of HFI Welded Pipes", 4th Pipeline Technology Conference, 2009, 12 pages.

(Continued)

*Primary Examiner* — Lisa M Caputo
*Assistant Examiner* — Jamel E Williams
(74) *Attorney, Agent, or Firm* — Sughrue Mion, PLLC

(57) ABSTRACT

A pipe testing apparatus is described. The apparatus comprises two pipe end holders, respectively to hold a first and a second end of a pipe section under test; a reeling former; a straightening former; and a translator to effect relative translational movement of the pipe and the reeling former and of the pipe and the straightening former to cause the pipe to move selectively into and out of contact with and to apply a contact force against one or other of the reeling former and the straightening former. Each pipe end holder comprises a pipe end connector and an extending arm extending beyond the pipe end connector in a pipe longitudinal direction; and a lateral actuator is provided in association with each extending arm to apply a transverse load to the arm at a point distal from the pipe end connector. A pipe testing method is also described.

30 Claims, 4 Drawing Sheets

(56) References Cited

FOREIGN PATENT DOCUMENTS

| | | | |
|---|---|---|---|
| EP | 507572 A1 | * | 10/1992 |
| GB | 2 513 342 A | | 10/2014 |
| GB | 2 518 280 A | | 3/2015 |
| GB | 2 518 376 A | | 3/2015 |
| GB | 2 523 914 A | | 9/2015 |
| GB | 2532994 A | | 6/2016 |
| GB | 2 538 569 A | | 11/2016 |
| JP | 59-017132 A | | 1/1984 |
| JP | 2013-217829 A | | 10/2013 |
| JP | 2014-238345 A | | 12/2014 |

OTHER PUBLICATIONS

Search Report dated Jun. 30, 2016 issued by the Intellectual Property Office of United Kingdom in application No. GB1507619.3.
Search Report dated Jun. 30, 2016 issued by the Intellectual Property Office of United Kingdom in application No. GB1507620.1.
International Preliminary Report on Patentability dated Nov. 16, 2017 issued by the International Bureau in No. PCT/GB2016/051266.
International Search Report dated Jul. 8, 2016 issued by the International Searching Authority in No. PCT/GB2016/051265.
International Search Report with Written Opinion dated Jul. 14, 2016 issued by the International Searching Authority in No. PCT/GB2016/051266.
"Mackinnon_marine_concept_rig", 1 page.

* cited by examiner

PIPE TESTING APPARATUS AND METHOD

CROSS REFERENCE TO RELATED APPLICATIONS

This application is a National Stage of International Application No. PCT/GB2016/051266 filed May 3, 2016, claiming priority based on British Patent Application No. 1507619.3 filed May 4, 2015, the contents of all of which are incorporated herein by reference in their entirety.

The invention relates to a test rig and a testing methodology for the qualification of subsea pipelines for offshore requirements. The invention in particular relates to a test rig and testing method for the simulation of the mechanical stresses experienced by a pipeline laid via a reeling process.

Rigid subsea pipelines are laid on the seabed for example as part of a system for the recovery and onward transport of hydrocarbons. Such pipelines need to deliver a reliable performance in extremely harsh and mechanically demanding conditions, transporting hydrocarbons for 25 or more years at up to 1000 Barg, at temperatures of up 200° C., and in a harsh corrosive and pressurised external environment. Moreover, even prior to experiencing these harsh in-service conditions, installation of a pipeline on the sea floor is a very mechanically demanding process. Effective testing of subsea pipelines to ensure that they can resist these mechanically demanding installation conditions and provide effective in-service performance is critical.

A common method of laying a subsea pipeline is the reel-lay system. A length of pipeline is spooled onto a large diameter drum mounted on board a purpose built vessel, which transports the spooled pipe to a laying site and from which it is unreeled, straightened, and lowered to the subsea surface.

Common rigid subsea pipeline installations comprise elongate pipes, for example having a diameter of 200 to 1270 millimetres, and typically manufactured from a structural steel or similar structural material provided with outer and inner linings to deal with the harsh operating environment. Relatively short individual sections, for example 12 metres long, are welded together onshore, for example by high frequency induction welding and a further protective external field joint coating is applied over each welded joint. This creates larger prefabricated lengths of pipeline.

Testing of subsea pipe sections to see that they meet offshore requirements, and in particular that they can produce the required in-service performance even after the difficult mechanical regime imposed by the reel laying process, requires testing by simulation of a number of material critical stages of this process.

In particular, it is necessary to test the effect of pipe deformation as the pipe is wound onto the reel, and as it is straightened on deployment off the reel at the pipe laying site. It is additionally necessary to test other potentially mechanically damaging stages of the laying process, for example simulating the friction between the outer coating and the roller grips in a tension tower that serves to lower a length of pipe from the deploying vessel to the surface, and to simulate sag bend and other effects as the pipe touches down. It is similarly necessary to simulate mechanically critical in-situ conditions, including for example testing of operation in hydrocarbon recovery conditions, testing for lateral and upheaval flexure for example occurring as the pipe become hot and expands, and becomes vulnerable to flexural fatigue.

However effective simulation of the reeling process, and in particular of the stresses and strains induced in the pipe as it is wound onto the reel and deforms to correspond to the reel diameter, and the subsequent stresses and strains as it is deployed off the reel and straightened, is particularly critical, not least since any damage at this stage may critically compromise mechanical performance during subsequent stages of the laying process or during use. Although the reels have a relatively large diameter, for example 20 metres, the pipe necessarily still deforms as it comes to conform to the reel diameter, and this will still lead to stress tending to produce longitudinal strain and ovalisation in the pipe. Further stresses occur when the pipe is straightened by a straightening system prior to laying. The key considerations in determining the stress/strain regime experienced by a pipe section in practice include reel diameter, the arc radius of the straightening former, and the back tension in the pipe. Effective and accurate simulation of all of these is a key requirement if a test is to be representative of practical reeling conditions.

A known testing system is a cantilever system in which a section of pipe is held pinned at one end and a bending force is applied at the other end for example by pulling the other end with a winch or the like to urge the pipe into a suitable former that simulates the reel or straightening former of an in-field system. Although such a test is included in the industry standard, a cantilever bending system does not provide a very good simulation of the stresses and strains that occur when the pipe bending occurs in contact with the reel or the straightening former in a real situation. There is no effective simulation of the back tension that would occur in a real system. A refinement has been proposed based loosely on four point bend principles, in which the section is held at both ends and caused to move laterally relative to and into a reeling former to introduce a bend simulating that as a pipe is reeled, and then caused to move laterally relative to and into a straightening former to simulate the straightening process.

As a simulation of the real in-field situation, this approach offers several advantages.

First, there is inherently a better simulation of the contact bending regime that occurs in practice as a pipeline is wound onto the reel or removed and straightened against a straightening former than is the case with the cantilever method.

Second, the use of end connectors at either end enables the system to be adapted to apply an axial load on the pipe and thus generate a suitable closed loop controlled back tension, again better simulating the back tension that occurs in practice.

Third, and similarly, closed loop controlled reeling rates can be more effectively simulated.

However, because the ends are essentially static there is an unrealistic reducing moment arm during the bend that can lead to excessive and uneven ovalisation which would not occur in a real system.

Thus, none of the prior art reeling and unreeling test rigs provide a fully effective simulation of the mechanical stresses and strains imposed on a pipe section during a real in-field reel lay process. As a result a pipe section under test that has been subjected to one of the prior art systems has not been subjected to a mechanical deformation regime that accurately corresponds to the in-field regime. This limits the ability to perform a more general through life simulation by subsequent testing on the same pipe section to simulate subsequent aspects of the laying or in-service regime to mimic more of the mechanical stresses and strains imposed on a pipe section the complete reel lay process and the consequential effects of this on performance in service.

The invention seeks to achieve some of the advantages of the immediately foregoing systems in a test rig that mitigates some of their disadvantages, in particular in relation to the reducing moment arm and increased ovalisation characteristic of the prior art method. The invention thus seeks in particular in the preferred case to provide a pipe test section after reeling and unreeling simulation that has experienced a more realistic deformation regime that more accurately corresponds to the in-field regime, and is thus for example a more useful staring sample for subsequent simulation of further aspects of laying or in-service conditions.

Thus, in accordance with the invention in a first aspect, a pipe testing apparatus is provided comprising:

two pipe end holders, respectively to hold a first and a second end of a pipe section under test;
a reeling former;
a straightening former;
a translator to effect relative translational movement of the pipe section under test and the reeling former and of the pipe and the straightening former to cause the pipe section under test to move selectively into and out of contact with and to apply a contact force against one or other of the reeling former and the straightening former;
wherein each pipe end holder comprises a pipe end connector and an extending arm extending beyond the pipe end connector in a pipe longitudinal direction;
and wherein a lateral actuator is provided in association with each extending arm to apply a transverse load to the arm at a point distal from the pipe end connector.

The principles of use of a translational motion relative to a reeling former to bring a pipe section into contact with and apply a progressive deformation force against a reeling former to simulate the reeling cycle, and subsequently to translational motion translate the pipe section away from the reeling former and then to translate the pipe section into contact with a straightening former and apply a progressive deformation force to simulate the straightening cycle, are retained in the apparatus in accordance with the invention.

The ends are held in a manner to provide a controlled axial loading and thus closed loop control of back tension.

However, the simulation of the reeling and straightening cycles in real situations is further improved in that a lateral actuator associated with the outward extending arm of each end holder is operable in use dynamically to apply a variable transverse load to the extending arm. This introduces a configurable and user variable bending moment into the system that may be dynamically adjustable to counteract the reducing moment arm effect inherent as the pipe deforms against the former in the statically held apparatus of the prior art.

It is possible to maintain, by suitable dynamic application of a transverse load using each lateral actuator, a near constant moment arm throughout the reeling or straightening cycle. It is possible to maintain a condition that better simulates reeling or straightening in the field, and therefore produces a better simulation of the ovalisation experienced by pipe sections in the field. It is possible to produce more uniform ovalisation along the pipe length It becomes possible to test a pipe section having two field joint coatings or four welds in a single test with controlled and near uniform ovality along the length.

This is enabled because the lateral actuators of the invention, under suitable dynamic control, allow a controlled, programmable variable moment arm to be achieved during the reeling or straightening cycle.

To simulate reeling, the translator effects relative movement between a pipe section under test and the reeling former to move the pipe section under test into contact with the former and further urges the pipe section against the reeling former to apply a progressive force to cause the pipe section under test to deform against the reeling former in a manner which simulates the deformation cycle as a pipe section is wound onto a reel in a practical situation prior to its deployment on a reeling vessel. As has been indicated above, the simulation is improved by use of the lateral actuator to counteract the moment arm reduction which would otherwise unrealistically occur in a prior art test rig. To effect this each lateral actuator is adapted in use to apply a variable transverse load to its respective arm at a point distal from the pipe end connector as the pipe section under test deforms against the reeling former, the variable transverse load being selected such as to tend to counteract the moment arm reduction which would otherwise occur as the pipe deforms against the reeling former.

Subsequently, to simulate straightening such as would occur against a straightening former as a pipe is deployed from a vessel to be laid at sea, the translator effects relative movement between a pipe section under test and the straightening former to move the pipe section under test into contact with the straightening former and further urges the pipe section against the former to apply a progressive force to tend to deform the pipe section back to a straightened configuration. Again, the simulation is improved by the use of the lateral actuators to counteract the shortening of the moment arm that would occur in a more statically held prior art apparatus. To effect this each lateral actuator is adapted in use to apply a variable transverse load to its respective arm at a point distal from the pipe end connector as the pipe deforms against the straightening former, the variable transverse load being selected such as to tend to counteract the moment arm reduction which would otherwise occur as the pipe deforms against the straightening former.

That is, operation differs from the prior art in that instead of merely holding the ends during the reeling and straightening deformation simulations in pipe end holders that apply a back tension, a pair of lateral actuators act on a point distal from each end of the pipe section under test by engagement with a point on the extending arm distal to the point where the end is connected to apply a controlled transverse load balancing the load applied by the former such as to tend to produce a dynamically varying moment arm that better simulates reeling or straightening in the field and produces a better simulation of the ovalisation effects that would be experienced by a pipe during reeling or straightening in the field.

Preferably, each pipe end holder is mounted for rotation about a pivot axis perpendicular to a plane in which the translator acts to effect relative translational movement of the pipe section under test and the reeling former or the pipe section under test and the straightening former. Preferably each pipe end holder pivots about an axis located more proximally to the pipe end connector than the point at which the lateral actuator applies a transverse load to the extending arm. For example each pipe end holder pivots about an axis located at or in close proximity to the pipe end connector. In this way, the extending arm can pivot so as at all times it extends in a direction that is generally a continuation of the axial direction of the end of the pipe section under test, allowing improved control of the transverse load and better directionality of any applied back tension.

As will be familiar from comparable prior art reeling test rigs without the refinement of the invention, each of the reeling former and the straightening former extends for a part of a length of a pipe test location as defined by the pair of end holders between which a pipe section under test will be held in use. That is to say, during use with a pipe section under test in situ, each of the reeling former and the straightening former extends alongside the pipe section under test in use for a part of its length and the pipe section under test extends beyond the former at either end to be held by each respective end holder.

Each former presents a shaped contact surface against which the pipe section under test is deformed. Suitable shapes of contact surface will be familiar. For example, a contact surface defined by a reeling former may comprise a circular arc contact surface to simulate the contact surface of a drum onto which a pipe is reeled in the field. A straightening former may have an elliptical arc contact surface to simulate the straightening process experienced in the field.

During use, a pipe test section is moved into and out of contact with the reeling former and then into and out of contact with the straightening former with a suitable progressive force being applied in each case.

In a convenient embodiment, the reeling former and the straightening former may be disposed either side of a pipe test location as defined by a pair of end holders between which a pipe section under test will be held in use. The translator is then configured to reciprocate into and out of contact with a one or another of the reeling former or the straightening former in such manner as to apply a progressive deformation force as the respective former and the pipe section under test are progressively forced into contact.

In a possible embodiment, a reeling former and a straightening former may be carried in a fixed rigid relationship to each other, for example on a first frame. End holders may be carried in such manner as to be translatable relative to the reeling former and the straightening former, for example being translatable laterally relative to the said first frame for example in a reciprocating manner, and for example being carried in fixed spatial relationship on a second frame translatable laterally for example in a reciprocating manner with respect to the first frame.

Preferably, each pipe end holder is pivotally connected to the second frame so as to be pivotable about a pivot axis perpendicular to the plane of translation between the second and first frame. Preferably each pipe end holder is mounted to pivot about an axis located at or in close proximity to the pipe end connector.

Preferably, each lateral actuator is carried on the first frame and disposed to bear upon and apply a transverse force to a respective extending arm of a respective pipe end holder. For example each lateral actuator may comprise an extending and retracting mechanism, and for example a telescoping mechanism, extending from a mounted position on the first frame to bear upon and apply a transverse force to a respective extending arm of a respective pipe end holder.

Preferably, the pipe testing apparatus is disposed to effect a horizontal translation in that the pipe lies between the reeling former and the straightening former in a generally horizontal disposition. For example, the reeling former and the straightening former are mounted on a first horizontal frame, the first and second end holders are mounted on a second horizontal frame, and the two frames are relatively translatable horizontally. In such an embodiment the first and second end holders are preferably pivotally connected to the second horizontal frame to be pivotable about a vertical pivot axis.

A horizontal arrangement such as this confers particular safety advantages. The pipe section under test is located entirely within the test rig, and in the event of failure is much more contained that would be the case for example for known cantilever systems.

Suitable drive means may be provided to effect relative lateral and for example reciprocating movement between the pipe end holders (and in consequence the pipe section under test in use) and the reeling former and the straightening former. In the preferred case, wherein the reeling former and the straightening former are carried on a first frame and the pipe end holders (and in consequence the pipe section under test in use) are carried on a second frame, a drive means and for example a reciprocating drive means is provided to effect movement of one, other or both of the said frames and thereby effect relative lateral movement of the frames in use.

The lateral actuator comprises a means to apply a transverse force to a point distal of the pipe end on a pipe end holder arm extension, for example to tend to move the same transversely of a pipe axial direction.

Preferably, the lateral actuator comprises an extending and retracting mechanism, and for example a telescoping mechanism.

Preferably, the lateral actuator comprises an extending and retracting ram, and for example a telescoping ram.

In a convenient embodiment, a lateral actuator comprises a hydraulic or pneumatic ram.

Subject to suitable dynamic control of the variable transverse load applied by the lateral actuators to counteract the effect of shortened moment arm that would otherwise occur, it is possible better to simulate conditions in the field, and in particular if desired to achieve a near constant moment arm throughout the reeling or straightening simulation. Preferably, control means are provided to effect dynamic control in use of the applied variable transverse load imposed on a respective outward extending arm of each end holder in order to achieve a desired moment arm condition throughout the reeling or straightening simulation cycle.

Each pipe end holder includes an end connector configured to engage and retain an end of a pipe section under test during the test process. Accordingly, each pipe end connector comprises a means to releasably engage a pipe end, and for example a bolt and socket arrangement.

Each end holder preferably further includes an axial force generator to apply a selective axial load to a pipe section under test the better to simulate back tension experienced by the pipe in a real situation. For example, each end holder includes a reciprocating axial force generator, which is for example a reciprocating hydraulic force generator, acting on the extending arm in a pipe axial direction to apply a back tension in use.

In accordance with the invention in a second aspect, a method of testing a pipeline section, for example for the qualification of subsea pipelines for offshore requirements, comprises the steps of:

holding a pipe section under test between two pipe end holders, respectively holding a first and a second end of the pipe section under test, and each provided with an arm extending beyond the pipe end connector in a pipe longitudinal direction;

disposing a reeling former alongside the pipe section under test;

disposing a straightening former alongside the pipe section under test, for example on an opposing side to the reeling former;

applying an axial load to the pipe section under test to simulate back tension;

effecting relative translational movement of the pipe and the reeling former or of the pipe and the straightening former to cause the pipe to move selectively into and out of contact with and to apply a contact force against one or other of the reeling former and the straightening former to deform the pipe into conformance with the former;

simultaneously therewith applying a transverse load to each arm at a point on the arm distal from the pipe end connector to such extent as to tend to counteract the reduction in effective moment arm that tends to occur along the pipe as it deforms to conform with the former.

In familiar manner the method preferably comprises first simulating reeling and then simulating straightening, and comprises the steps of:

first effecting relative translational movement of the pipe and the reeling former to cause the pipe to move into contact with the reeling former to deform the pipe into conformance with the reeling former;

second effecting relative translational movement of the pipe and the reeling former to cause the pipe to move out of contact with the reeling former;

third effecting relative translational movement of the pipe and the straightening former to cause the pipe to move into contact with the straightening former to deform the pipe into conformance with the straightening former;

fourth effecting relative translational movement of the pipe and the straightening former to cause the pipe to move out of contact with the straightening former.

The principles of the method make use of a translational motion relative to a reeling former to bring a pipe section into contact with and apply a progressive deformation force against a reeling former to simulate reeling, and subsequently to translate the pipe section away from the reeling former and then to translate the pipe section into contact with a straightening former and apply a progressive deformation force to simulate straightening. The ends are held in a manner to apply a back tension and in particular to provide closed loop control of back tension.

The method is characterised in that the simulation of the reeling and straightening cycles in real situations is further improved by dynamically applying a variable transverse load to the extending arm of each pipe end holder. This introduces a configurable and user variable bending moment into the system that may be dynamically adjustable to counteract the reducing moment arm effect inherent in the statically held system of the prior art.

Preferably, the transverse load is dynamically adjusted during the deformation cycle as the pipe section under test deforms into conformance with the reeling former or straightening former as the case may be to maintain a simulation of the moment arm variation throughout the reeling or straightening cycle that better simulates reeling or straightening in the field. Preferably, the transverse load is dynamically adjusted during the deformation cycle as the pipe section under test deforms into conformance with the reeling former or straightening former as the case may be to maintain a near constant moment arm throughout the reeling or straightening cycle.

This is enabled because the lateral actuators of the invention, under suitable dynamic control, allow a controlled, programmable variable moment arm to be achieved during the reeling or straightening cycle.

The method is in particular a method applied to operation of the apparatus of the first aspect of the invention and the skilled person will infer further preferred features of the method by analogy with the foregoing discussion of the operation of the apparatus of the first aspect of the invention.

For example, the reeling former and the straightening former may be disposed either side of a pipe section under test. The pipe section under test may then be moved reciprocally into and out of contact with a one or another of the reeling former or the straightening former in such manner as to apply a progressive deformation force as the respective former and the pipe section under test are progressively forced into contact.

In a possible embodiment, a reeling former and a straightening former may be carried in a fixed rigid relationship to each other, for example on a first frame. End holders may be carried in a manner translatable to the reeling former and the straightening former, for example being translatable laterally relative to the said first frame, and for example being carried in fixed relationship on a second frame translatable with respect to the first frame.

Preferably, the method effects a horizontal translation in that the pipe section under test is held between the reeling former and the straightening former in a generally horizontal disposition.

Preferably each pipe end holder is pivoted about a pivot axis perpendicular to the plane of translational movement of the pipe and the reeling former or of the pipe and the straightening former. Most preferably each pipe end holder is pivoted about an axis located at or in close proximity to the pipe end connector. Desirably each pipe end holder is pivoted in such manner that the extending arm at all times extends in a direction that is generally a continuation of the axial direction of the end of the pipe section under test.

Preferably the transverse force applied to a point distal of the pipe end on a pipe end holder arm extension is applied to tend to move the same transversely of a pipe axial direction.

Preferably the transverse force is applied by a lateral actuator.

Preferably, the lateral actuator comprises an extending and retracting mechanism, and for example a telescoping mechanism.

Preferably, the lateral actuator comprises an extending and retracting ram, and for example a telescoping ram.

In a convenient embodiment, a lateral actuator comprises a hydraulic or pneumatic ram.

Preferably a dynamic control of the applied variable transverse load imposed on a respective outward extending arm of each end holder is maintained to achieve a desired moment arm condition throughout the reeling or straightening simulation cycle.

For convenience herein, and in particular with reference to certain preferred embodiments in which the pipe, the reeling former, and the straightening former are held horizontally and moved transversely by a suitable translator in a horizontal direction, reference may occasionally be made to such horizontal translation by way of example. It will be understood that this is an example orientation only. Similarly, where reference is made to a pipe axial direction, this will be understood to refer to an actual direction of a pipe in-situ during use, as a means to orient components of the apparatus even when the pipe is not present. Similarly, references to a transverse direction will be understood to refer to a direction transverse of the axial direction with the pipe in-situ in use.

The invention will now be described by way of example only with reference to FIGS. 1 to 5 of the accompanying drawings in which.

Figure 2:
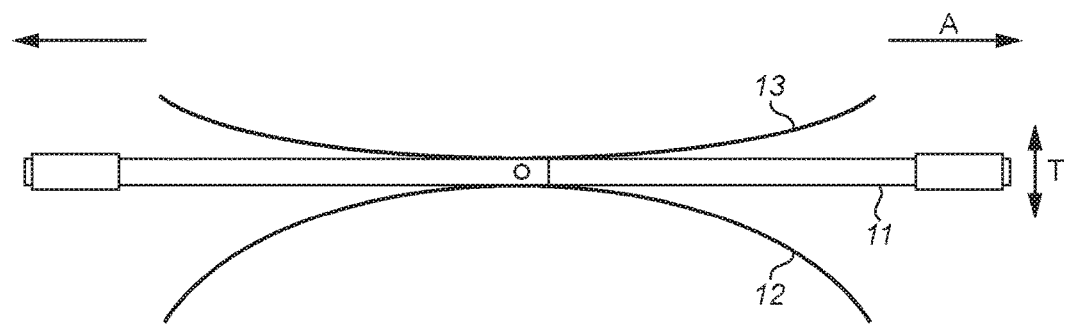
FIG. 2 is a schematic representation of an alternative prior art reeling test method and apparatus.
Figure 4:
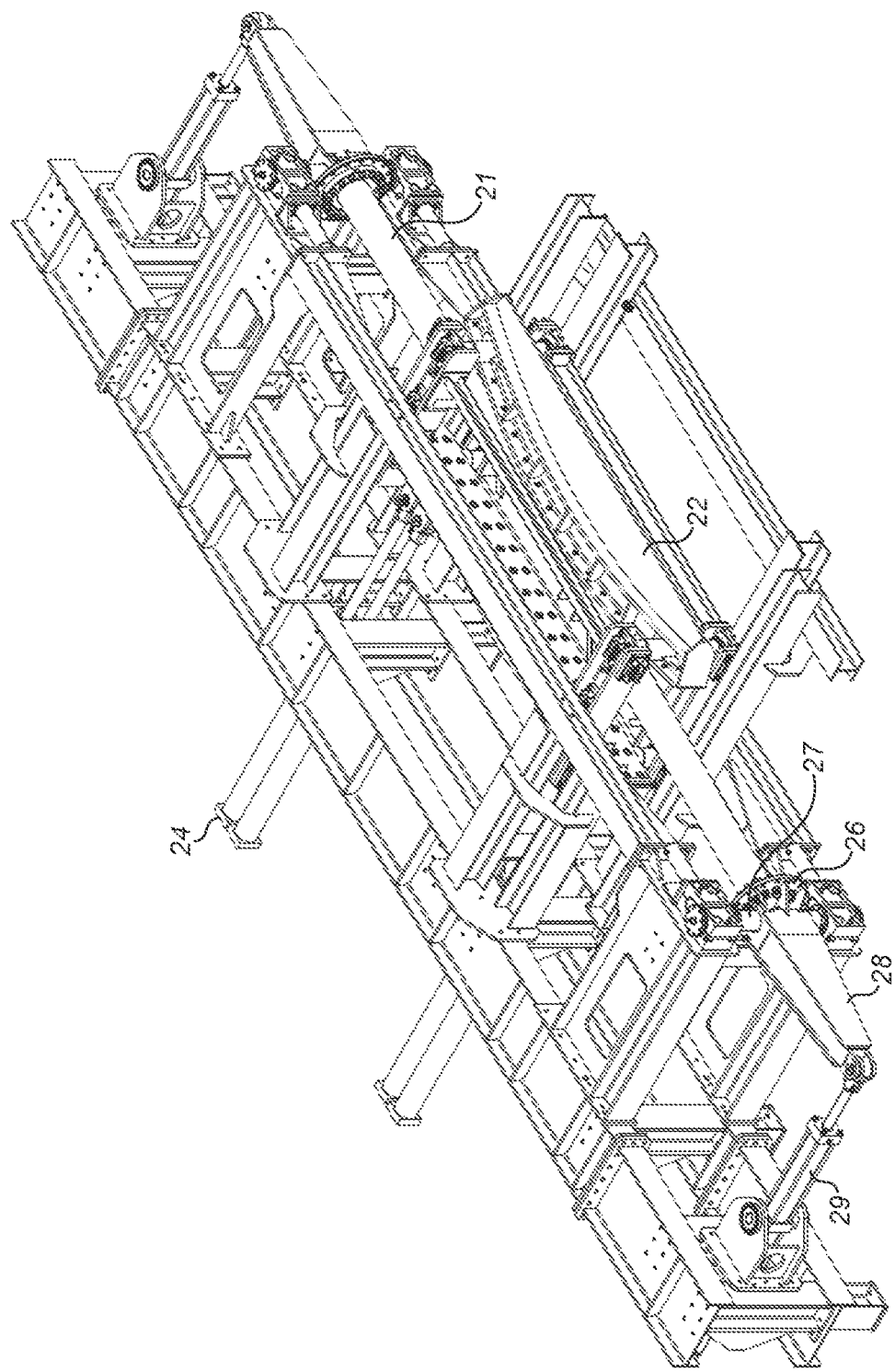
FIG. 4 is a perspective view of a modified reeling test apparatus in accordance with an embodiment of the invention.
Figure 5:
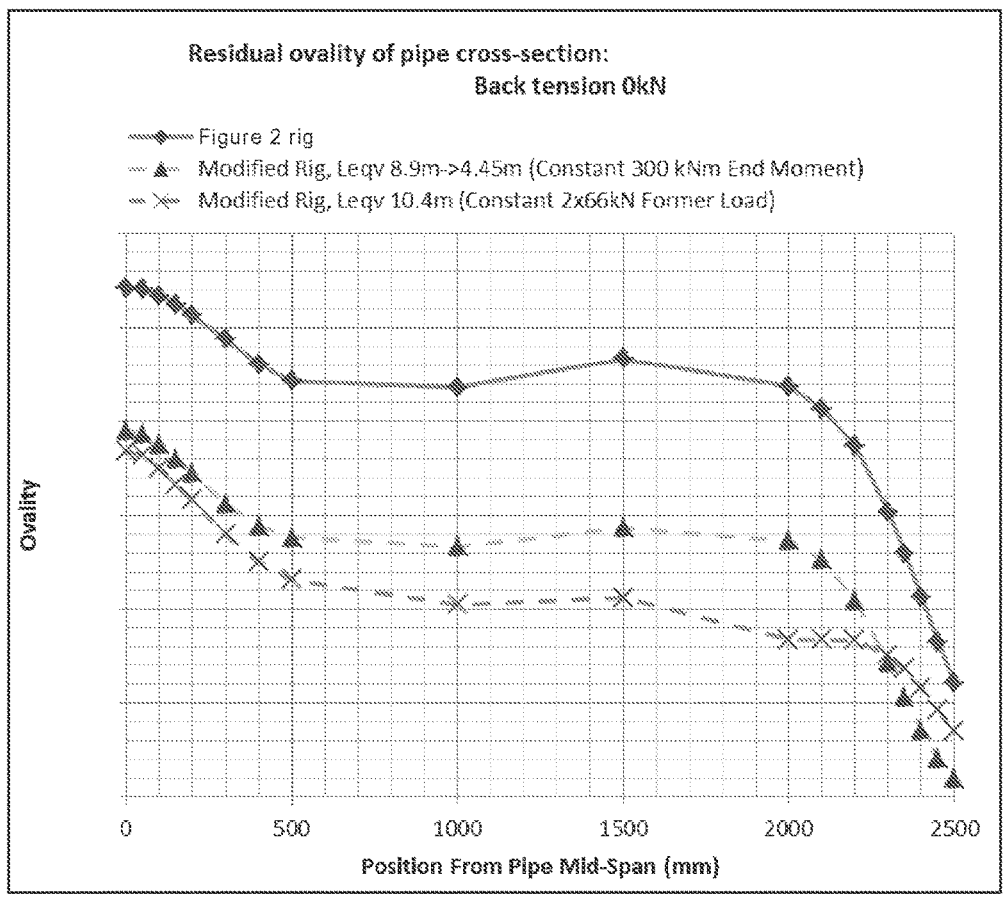

FIG. 5 compares the residual ovality of pipe cross-section when tested on rigs such as illustrated respectively in FIGS. 2 and 4.

The function of a reeling test rig is to simulate the stresses and strains experienced in a pipe during a typical reel lay pipe installation process, so as to achieve more effective qualification of the subsea pipeline for offshore requirements.

In a practical system, successive sections of steel pipeline are typically welded by a high frequency induction process, a field coating is applied to the weld, and the length of pipeline so produced is fed onto a reel for transport to a laying site via a reeling vessel, where it is unreeled, straightened and laid.

The principle mechanical considerations to be tested in any simulation of a typical reeled pipe installation process can be summarised as below.

First, the pipe is applied to the reel. As the pipe is urged to conform to the curvature of the reel, loading occurs producing a cycle of elastic-plastic deformation until the pipe curvature conforms to that of the reel radius.

Second, the pipe is unreeled. Some loading occurs as the pipe begins to straighten merely as it is removed from the reel, but to complete the straightening process the pipe is reverse deformed against a straightening former, producing a second deformation load leading to a second elastic-plastic deformation cycle. The straightening former is typically designed to produce a counter curvature of just sufficient degree that once the straightening load is removed, elastic unloading of the pipe occurs to cause the pipe to tend to return to an essentially unloaded and straight condition.

Amongst the major considerations which affect the behaviour of the pipe during the reeling and deployment process are the effective radius of the reel, the effective radius of the straightening former, the back tension to which the pipeline is subject, and the moment arm experienced during bending against the reel and against the straightening former.

It will be understood that any simulation of the overall pipeline mechanical response during installation (and the consequences of that mechanical response to its reliability and service), will need an effective simulation of the cyclic elastic-plastic deformations that occur in the field, and an effective simulation of the above in-field factors in particular.

Figure 1:
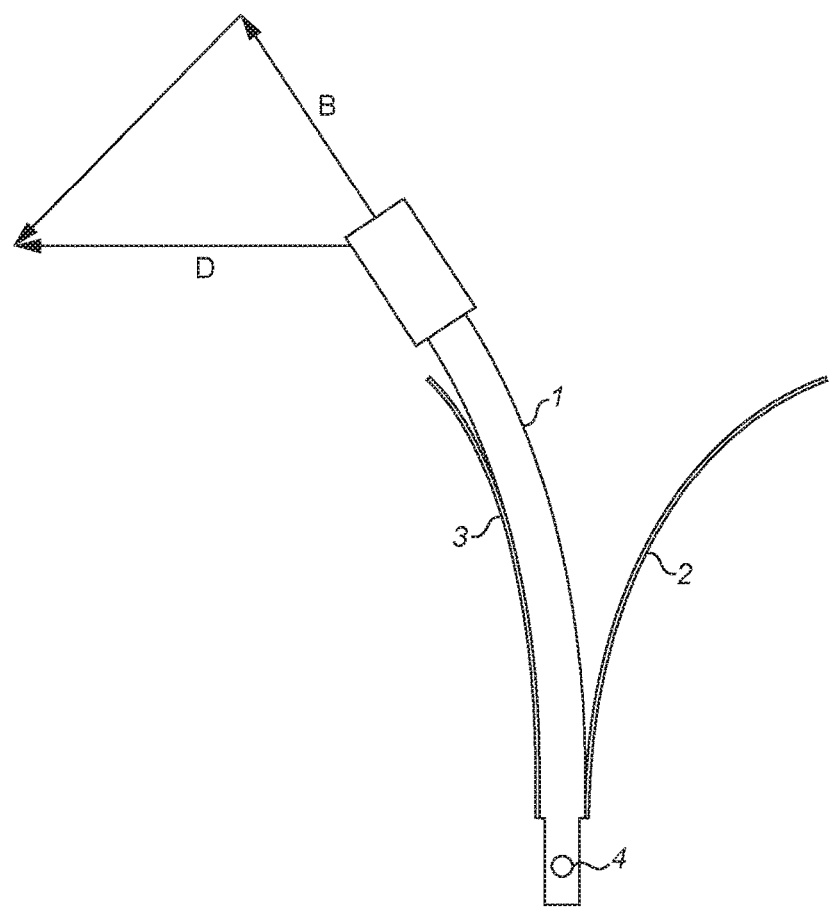
FIG. 1 is a schematic representation of a prior art standard reeling test method and apparatus.

A simple prior art reeling test in accordance with a current industry standard is illustrated schematically with reference to FIG. 1.

In accordance with FIG. 1, a pipe section under test 1 is selectively pulled towards a reeling former 2 and subsequently a straightening former 3 with curvature intended to simulate the reeling and straightening phases of the in-field cycle. The test is essentially a free cantilever test, in that one end of the pipe is held by a pinned joint 4 while the other end is pulled towards the respective formers via a winch in the pull direction D.

The apparatus and method of FIG. 1 does allow careful and appropriate selection of a suitable reeling former and a suitable straightening former to obtain accurately representative reeling and straightening former radius simulation.

However, using a winch to pull the free end does not provide an effective simulation of the back tension experienced by a pipeline in the field. The winch pulls the free end of the pipe section under test in a direction which is initially perpendicular to a pipe test section axial direction, but as the pipe bends towards the former, the winch pull direction ceases to be transverse to the pipe axial direction, producing an increase in uncontrolled back tension generally in direction B as the pipe bends towards the reeling former, and a different increase in uncontrolled back tension as the pipe is subsequently pulled towards and deforms against the straightening former. The apparatus and method of FIG. 1 does not produce an effective means to simulate the back tension experienced by a pipe in a real situation.

Additionally, as the pipe bends towards each of the respective formers, it experiences a reducing moment arm (on a typical scale for example from approximately nine metres to approximately four metres) which results in increasing pipe ovalisation. Again, this does not realistically simulate in-field conditions.

Nor is it easy with a conventional cantilever reeling test rig to simulate different controlled reeling rates.

The winch pulley system generates a large stored energy in operation, which can present a significant safety hazard in the event of pipe section failure.

An alternative modified design has been proposed as shown schematically in FIG. 2. A pipe section under test 11 sits between a reeling former 12 and a straightening former 13. In an example embodiment, the arrangement is disposed horizontally on a suitable support frame (not shown). Pipe reeling and straightening conditions are simulated by reciprocally urging the pipe section under test via a suitable translation means in the directions T first against the reeling former 12 and then against the straightening former 13. Axial loading means acting in direction A are used to apply a controlled tensile load in an axial direction, the better to simulate the back tension experienced by a pipe in the field.

Such a system allows for accurate selection of reeling and straightening former radius, and for example the provision of interchangeable reeling and straightening formers. The axial load generators enable a closed loop controlled back tension to be applied, for example under action of suitable control means with feedback from a load cell on the pipe. Suitable frame mountings can allow the transverse load in direction T to be applied in a controlled and repeatable manner to simulate variable controlled and repeatable reeling rates. The test specimen may be fully enclosed within the system, enhancing safety in the event of test specimen failure. Enclosing the system may also provide for possible simulation of in-situ non-standard environmental conditions.

Figure 3:
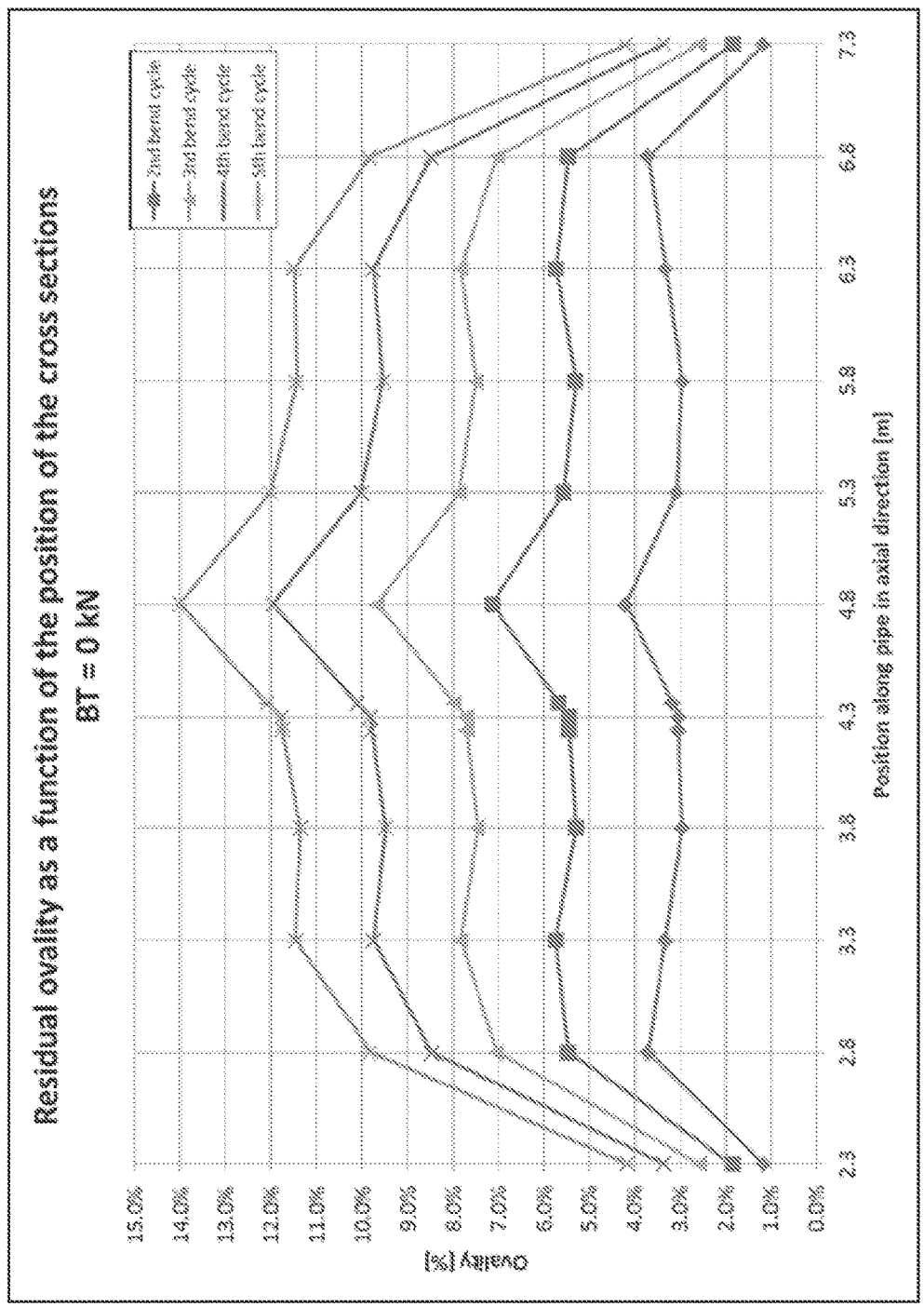
FIG. 3 is a graphical representation of the residual ovality as a function of the position of the cross-section of a pipe tested in accordance with the apparatus and method of FIG. 2.

However, a system as illustrated in FIG. 2 still suffers from an unrealistically reducing bending moment arm as the pipe section deforms to conform to each respective former, for example typically from around five metres to around 2.5 metres along the pipe. The result of this is an unacceptable and unrealistic residual ovality which varies as a function of the position of the cross-section for example in the manner illustrated graphically in FIG. 3.

A solution in accordance with an embodiment of the invention is illustrated in FIG. 4. Some of the general principles of FIG. 2 are applied, in that a pipe section under test 21 is positioned between a reeling former 22 and a straightening former in similar disposition to the illustrated in FIG. 2. In the figure, the pipe section under test 21 is shown urged into and deformed against the reeling former 22 in simulation of the reeling process.

The pipe ends are held by pipe end holders 26 which are pivotally mounted about pivots 27 on a rigid frame 25 and configured to apply a controlled axial load to the pipe section under test to simulate the back tension in a real system. The reeling former and straightening former are mounted in fixed spatial relationship either side of the location of the pipe section under test on a slidable frame module which is reciprocally moveable under action of hydraulic rams 24 to cause the pipe section under test to be urged selectively into contact with and deform against first the reeling former and then the straightening former to simulate the reeling and straightening deformations experienced in the field.

The particular adaptation by means of which the uncontrolled reduction in moment arm effect experienced in test rigs configured such as that illustrated in FIG. 2 is achieved is the combination of the pipe end holder extending arm 28 and hydraulic ram 29. As the pipe deforms against the reeling former 22, each hydraulic ram 29 extends to apply a transverse load at a point on the arm 28 distal from the pipe end connection 27, which cooperates with pivoting connection 26 to apply a bending moment to the pipe ends which can be controlled to such level as is required to counteract the reducing moment arm effect and better replicate the mechanical situation experienced in the field during reeling.

The same principles apply when the pipe section is subsequently deformed against a straightening former, with the hydraulic rams 29 again being configurable to apply a configurable and controlled bending moment the better to replicate conditions on the installation vessel as the pipe is unreeled and straightened.

The embodiment illustrated in FIG. 4 combines all of the advantages of the FIG. 2 apparatus with a simple and effective solution to the problem of residual ovality generated by the reducing moment arm experienced as the pipe deforms against the two formers in FIG. 2. This is illustrated graphically in FIG. 5. The residual ovality of pipe cross-section produced by the test rig of the embodiment illustrated in FIG. 4 is a more realistic simulation of in-field conditions. The apparatus and method exemplified by FIG. 4 allows for accurate simulation of the reeling and straightening former radii, allows for a closed loop controlled back tension, allows for closed loop controlled reeling rates, allows for increased safety by containment of the pipe section under test and by use of hydraulic loading, and allows for a more constant moment arm during bend producing more constant ovalisation of the pipe. It becomes possible to test more than one welded pipe section in a single test, and for example to test two field joint coating or four welds in a single test with confidence of uniform ovality.

The invention claimed is:

1. A pipe testing apparatus comprising:
    two pipe end holders, respectively to hold a first and a second end of a pipe section under test;
    a reeling former;
    a straightening former;
    a translator to effect relative translational movement of the pipe and the reeling former and of the pipe and the straightening former to cause the pipe to move selectively into and out of contact with and to apply a contact force against one or other of the reeling former and the straightening former;
    wherein each pipe end holder comprises a pipe end connector and an extending arm extending beyond the pipe end connector in a pipe longitudinal direction;
    and wherein a lateral actuator is provided in association with each extending arm to apply a transverse load to the arm at a point distal from the pipe end connector.

2. A pipe testing apparatus in accordance with claim 1 wherein the translator is adapted to simulate reeling by effecting relative movement between a pipe section under test and the reeling former to move the pipe section under test into contact with the former and further urge the pipe section against the reeling former to apply a progressive force to cause the pipe to deform against the reeling former.

3. A pipe testing apparatus in accordance with claim 2 wherein each lateral actuator is adapted to apply a variable transverse load to its respective arm at a point distal from the pipe end connector as the pipe deforms against the reeling former.

4. A pipe testing apparatus in accordance with claim 1 wherein the translator is adapted to simulate straightening by effecting relative movement between a pipe section under test and the straightening former to move the pipe section under test into contact with the former and further urge the pipe section against the straightening former to apply a progressive force to cause the pipe to deform against the straightening former.

5. A pipe testing apparatus in accordance with claim 4 wherein each lateral actuator is adapted to apply a variable transverse load to its respective arm at a point distal from the pipe end connector as the pipe deforms against the straightening former.

6. A pipe testing apparatus in accordance with claim 1 wherein each pipe end holder is mounted for rotation about a pivot axis perpendicular to a plane in which the translator acts.

7. A pipe testing apparatus in accordance with claim 6 wherein each pipe end holder is mounted to pivot about an axis located more proximally to the pipe end connector than the point at which the lateral actuator applies a transverse load to the extending arm.

8. A pipe testing apparatus in accordance with claim 7 wherein each pipe end holder is mounted to pivot about an axis located at or in close proximity to the pipe end connector.

9. A pipe testing apparatus in accordance with claim 1 wherein the reeling former and the straightening former are disposed either side of a pipe test location as defined by a pair of end holders between which a pipe section under test will be held in use, and wherein the translator is configured to reciprocate into and out of contact with a one or another of the reeling former or the straightening former in such manner as to apply a progressive deformation force as the respective former and the pipe section under test are progressively forced into contact.

10. A pipe testing apparatus in accordance with claim 1 wherein the reeling former and the straightening former are carried in a fixed rigid relationship to each other on a first frame, and wherein the pipe end holders are carried in such manner as to be translatable relative to the reeling former and the straightening former.

11. A pipe testing apparatus in accordance with claim 10 wherein the pipe end holders are carried on a second frame translatable laterally with respect to the first frame.

12. A pipe testing apparatus in accordance with claim 11 wherein each pipe end holder is pivotally connected to the second frame so as to be pivotable about a pivot axis perpendicular to the plane of translation between the second and first frame.

13. A pipe testing apparatus in accordance with claim 1 wherein the reeling former and the straightening former are disposed in a generally horizontal disposition either side of a pipe test location as defined by a pair of end holders between which a pipe section under test will be held in use.

14. A pipe testing apparatus in accordance with claim 13 wherein the reeling former and the straightening former are mounted on a first horizontal frame, the first and second end holders are mounted on a second horizontal frame, and the two frames are relatively translatable horizontally.

15. A pipe testing apparatus in accordance with claim 1 wherein each lateral actuator comprises an extending and retracting mechanism.

16. A pipe testing apparatus in accordance with claim 15 wherein each lateral actuator comprises an extending and retracting hydraulic or pneumatic ram.

17. A pipe testing apparatus in accordance with claim 1 further comprising control means to effect dynamic control in use of the applied variable transverse load imposed on a respective outward extending arm of each end holder in order to achieve a desired moment arm condition throughout the reeling or straightening simulation cycle.

18. A pipe testing apparatus in accordance with claim 1 wherein each pipe end holder includes an axial force generator to apply a selective axial load to a pipe section under test in use.

19. A method of testing a pipeline section comprising the steps of:
holding a pipe section under test between two pipe end holders, respectively holding a first and a second end of the pipe section under test, and each provided with an arm extending beyond the pipe end connector in a pipe longitudinal direction;
disposing a reeling former alongside the pipe section under test;
disposing a straightening former alongside the pipe section under test;
applying an axial load to the pipe section under test to simulate back tension;
effecting relative translational movement of the pipe and the reeling former or of the pipe and the straightening former to cause the pipe to move selectively into and out of contact with and to apply a contact force against one or other of the reeling former and the straightening former to deform the pipe into conformance with the former;
simultaneously therewith applying a transverse load to each arm at a point on the arm distal from the pipe end connector to such extent as to tend to counteract the reduction in effective moment arm that tends to occur along the pipe as it deforms to conform with the former.

20. A method in accordance with claim 19 comprising the steps of:
first effecting relative translational movement of the pipe and the reeling former to cause the pipe to move into contact with the reeling former to deform the pipe into conformance with the reeling former;
second effecting relative translational movement of the pipe and the reeling former to cause the pipe to move out of contact with the reeling former;
third effecting relative translational movement of the pipe and the straightening former to cause the pipe to move into contact with the straightening former to deform the pipe into conformance with the straightening former;
fourth effecting relative translational movement of the pipe and the straightening former to cause the pipe to move out of contact with the straightening former.

21. A method in accordance with claim 19 wherein the transverse load is dynamically adjusted during the deformation cycle as the pipe section under test deforms into conformance with the reeling former or straightening former as the case may be to maintain a simulation of the moment arm variation throughout the reeling or straightening cycle that better simulates reeling or straightening in the field.

22. A method in accordance with claim 21 wherein the transverse load is dynamically adjusted during the deformation cycle as the pipe section under test deforms into conformance with the reeling former or straightening former as the case may be to maintain a near constant moment arm throughout the reeling or straightening cycle.

23. A method in accordance with claim 19 wherein the reeling former and the straightening former are disposed either side of a pipe section under test and the pipe section under test is moved reciprocally into and out of contact with a one or another of the reeling former or the straightening former in such manner as to apply a progressive deformation force as the respective former and the pipe section under test are progressively forced into contact.

24. A method in accordance with claim 23 wherein the method effects a horizontal translation in that the pipe section under test is held between the reeling former and the straightening former in a generally horizontal disposition.

25. A method in accordance with claim 19 wherein the transverse force applied to a point distal of the pipe end on a pipe end holder arm extension is applied to tend to move the same transversely of a pipe axial direction.

26. A method in accordance with claim 19 wherein each pipe end holder is pivoted about a pivot axis perpendicular to the plane of translational movement of the pipe and the reeling former or of the pipe and the straightening former.

27. A method in accordance with claim 26 wherein each pipe end holder is pivoted about an axis located at or in close proximity to the pipe end connector.

28. A method in accordance with claim 26 in which each pipe end holder is pivoted in such manner that the extending arm at all times extends in a direction that is generally a continuation of the axial direction of the end of the pipe section under test.

29. A method in accordance with claim 19 wherein the transverse force is applied by a lateral actuator.

30. A method in accordance with claim 29 wherein the lateral actuator comprises an extending and retracting mechanism.

* * * * *